United States Patent [19]

Bleckman

[11] Patent Number: 4,730,099

[45] Date of Patent: Mar. 8, 1988

[54] ELECTRICAL LIQUID HEATING APPARATUS

[76] Inventor: Ingo Bleckman, Ignaz-Rieder-Kai 11, A-5020 Salzberg, Austria

[21] Appl. No.: 900,339

[22] Filed: Aug. 25, 1986

[30] Foreign Application Priority Data

Sep. 11, 1985 [DE] Fed. Rep. of Germany ... 8525950[U]
Dec. 3, 1985 [DE] Fed. Rep. of Germany ... 8534008[U]

[51] Int. Cl.[4] ......................... H05B 1/02; H05B 3/82; A47J 27/21

[52] U.S. Cl. .................................... 219/328; 219/316; 219/318; 219/336; 219/437; 219/441; 219/523

[58] Field of Search ............... 219/316, 318, 328, 331, 219/335, 336, 436–438, 441, 442, 523, 536

[56] References Cited

U.S. PATENT DOCUMENTS 4,510,375 4/1985 Inskip et al. .................... 219/523 X

*Primary Examiner*—Patrick R. Salce
*Assistant Examiner*—Emanuel Todd Voeltz
*Attorney, Agent, or Firm*—Philip A. Mallinckrodt; Robert R. Mallinckrodt

[57] ABSTRACT

A liquid heating apparatus comprises a container or vessel having disposed therein a tubular heater member which is bent in a double loop configuraton with a raised central portion thereof being welded or soldered in a strip configuration, having low thermal conductivity, that substantially bridges mutually spaced ends of such tubular heater member which are attached to a mounting plate supported by the container. A thermally actuated cut-out switch bears against the plate from the outside of the container and is adapted to respond in a sensitive fashion to heat transfer from the adjacent central portion of the tubular heater member in the event of thermal overloading or running dry of the tubular heater member.

24 Claims, 8 Drawing Figures

FIG. 3
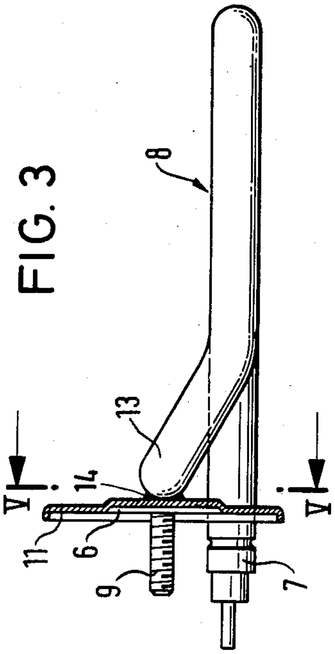
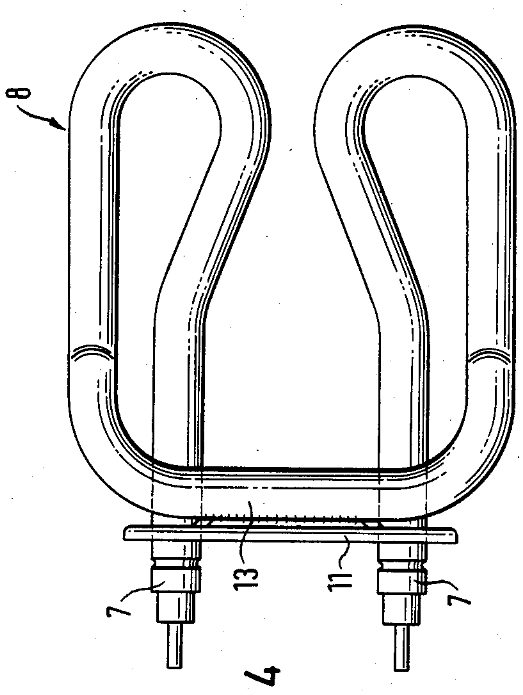
FIG. 4
FIG. 5
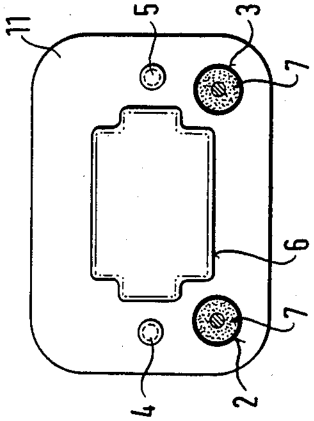

ELECTRICAL LIQUID HEATING APPARATUS

BACKGROUND OF THE INVENTION

There are many different forms of apparatuses for heating liquids, which involve the use of a heater member disposed in the container for the liquid and thus actually immersed in the liquid to be heated thereby. Thus, in one such apparatus, as disclosed in German laid-open application (DE-OS) No. 32 19 307, the apparatus is in the form of a water kettle comprising a vessel for receiving the liquid to be heated and, disposed in the vicinity of the bottom thereof, an electrical immersion-type heater having a mounting plate to which a heating element is secured. The mounting plate is secured by means of a single fixing device to the wall of the vessel, while a part of the active portion of the heating element is connected solely and directly to a heat-conducting portion of the fixing device. That arrangement provides a thermal bridge from the heating element to a thermally operated cut-out switch in the form of a bimetal switch which is disposed outside the vessel. The thermal bridge is formed by a round screw bolt with which the heating element is clamped to the wall of the vessel for containing the liquid. The arrangement is such that the switch switches off the heating element when a given limit temperature is exceeded.

However, in order for the thermally operated switch to respond to an excessive temperature, the thermal bridge formed by the screw bolt must comprise a material which is a good conductor of heat, for example copper, while the outer casing of the heating element, which is for example in the form of a jacket or casing tube, will generally comprise chrome nickel steel which has a substantially lower degree of thermal conductivity. As the casing tube of the heating element is additionally relatively thin, it also has a correspondingingly low heat capacity.

If the heating element overheats for any reason, for example becoming red-hot, then the amount of heat which flows away from the heating element by way of the relatively small contact area provided by the screw pin is so great that that area remains at a substantially lower temperature than the adjacent parts of the arrangement. As a result of that, either the normal operating temperature of the heating element must be set at a fairly low value, which has the consequence that an excessively long period of time is required in order to heat up the liquid to be heated in the vessel, or it is necessary to accept that critical temperatures will be exceeded somewhere along the length of the heating element.

In the above-described construction of a kettle with an immersion-type heater therein, the connection end portions of the heating element are disposed at substantially the same level as the thermal bridge to the bimetal switch. The connection end portions of the heating element must accordingly be kept inactive or inoperative in regard to heating action so that for example in the event of the liquid in the vessel boiling away or otherwise evaporating with the result that the apparatus runs dry, the connection end portions of the heating element do not suffer from overheating before the bimetal switch responds to the increased temperature. That in turn means that part of the length of the heating element is lost and useless in regard to producing a heating action, and is not available in regard to monitoring and checking overheating.

SUMMARY OF THE INVENTION

An object of the present invention is to provide a liquid heating apparatus which substantially overcomes the disadvantages encountered in prior art devices.

Another object of the present invention is to provide a liquid heating apparatus which provides for improved response on the part of a thermally actuated cut-out switch.

Still another object of the present invention is to provide an apparatus for heating a liquid by means of an immersed heater, with improved means for preventing the heater from burning through due to running dry.

A further object of the present invention is to provide a liquid heating apparatus which affords an increased heat output while enjoying enhanced security against failure due to excessive thermal loadings.

These and other objects are achieved by an electrically operated liquid heating apparatus comprising a vessel for receiving the liquid to be heated and, provided in the side wall of the vessel in the vicinity of the bottom thereof, openings for the connection end portions of a tubular heating member to pass therethrough. The tubular heater member is bent into such a configuration as to define twin loops, with a central section connecting the loops. The central section includes a straight portion which is disposed in the vicinity of the connection end portions of the tubular heater member and which extends above the connection end portions, forming a bridge over same. The straight portion of the central section of the tubular heater member forms a thermal bridge to a thermally operated cut-out switch which is disposed outside the vessel, the switch being operable to switch off the tubular heater member when a given temperature is exceeded. A part, of substantial length, of the straight portion of the central section of the tubular heater member is fixed to a mounting plate as by welding or soldering. The mounting plate is carried on the connection end portions of the tubular heater member and co-operates with the inside surface of the side wall of the vessel. Disposed between the mounting plate and the adjacent inside surface of the side wall of the vessel is a seal for sealing around the above-mentioned openings for receiving the connection end portions of the tubular heater member, together with the openings provided for receiving clamping screw members which secure the mounting plate in position in relation to the vessel.

Further objects, features and advantages of the arrangement in accordance with the present invention will be apparent from the following description of preferred embodiments thereof.

BRIEF DESCRIPTION OF THE DRAWINGS

FIG. 3 is a side view on an enlarged scale of the tubular heater member of the FIG. 1 apparatus, together with the mounting plate carrying same, FIG. 4 is a plan view of the tubular heater member and mounting plate shown in FIG. 3, FIG. 5 is a view in section showing the connecting portion of the assembly in elevation, the view being taken on the line V—V in FIG. 3 avoiding the join of the raised central portion of the tubular heater with the plate.

DESCRIPTION OF THE PREFERRED EMBODIMENTS

Figure 1:
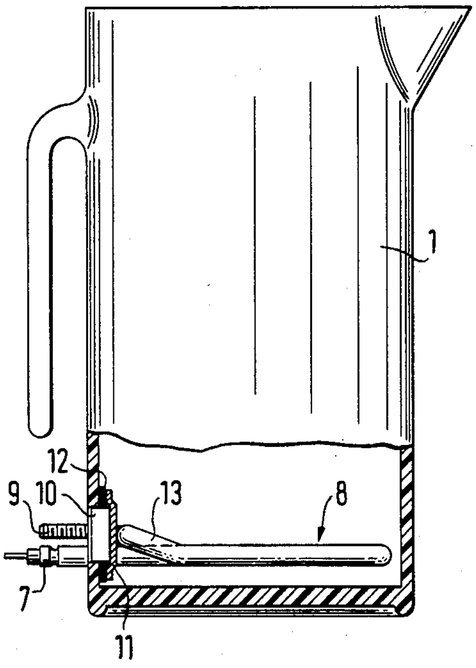
FIG. 1 is a view in side elevation and partly in axial vertical section of a liquid heating apparatus according to the invention.
Figure 2:
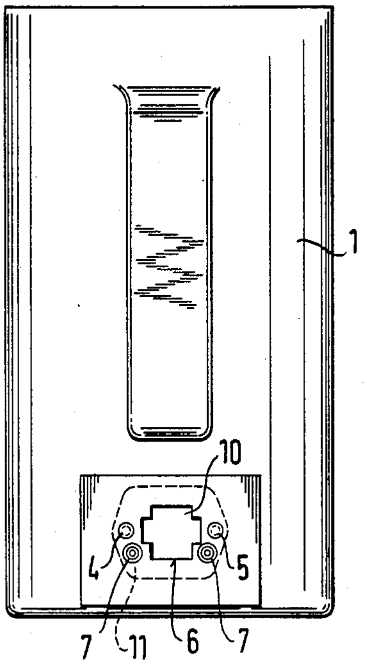
FIG. 2 is a rear elevational view showing the connection portion of the apparatus, with protective cap and thermally operated switch removed.

Referring firstly to FIGS. 1 and 2, shown therein is an electrically operated liquid heating apparatus in the form of a water heating jug or kettle comprising a vessel or container 1. As can be clearly seen from FIG. 1, the container 1 comprises a peripheral side wall and a bottom, together with a spout and a carrying handle of the usual kind.

Provided in the side wall of the container 1 and adjacent to the bottom thereof are openings 2 and 3 which are shown in FIG. 5, for receiving connection end portions 7 of a tubular heater member as indicated generally at 8. The side wall of the container 1 additionally has further openings 4 and 5 which are shown for example also in FIG. 2, for receiving clamping screw members 9 in the form of screw pins which are suitably fixed to a mounting plate as indicated at 11. The side wall of the container 1 further has an opening 6 which is shown in FIGS. 2 and 5, of generally square or rectangular configuration, for receiving a thermally operated switch or thermostat switch as indicated at 10 in FIGS. 1 and 2. It will be seen therefore more particularly from FIG. 1 that the tubular heater member 8 is disposed adjacent to and substantially parallel to the bottom of the container 1.

Referring now also to FIGS. 3 and 4, the tubular heater member 8 is of a bent configuration such as to provide first and second loop configurations which, in the illustrated embodiment, are of substantially symmetrical shape, as can be most clearly seen from FIG. 4. An end portion of each loop configuration forms a respective connection portion 7 of the tubular heater member 8 while the two loop configurations connect with each other through a central connecting section 13 as shown for example in FIG. 4. It will be seen from FIGS. 1, 3 and 4 that the central section 13 extends transversely above the connection end portions 7 of the tubular heater member 8, and thus bridges over same. The central section 13 includes a straight portion of substantial length which is connected at the location indicated generally by 14 to the above-mentioned mounting plate 11. The mounting plate 11 comprises a material such as an alloy which is a poor conductor of heat, preferably being a chrome nickel steel. The connection between the straight portion of the central section 13 and the mounting plate 11 is made by means of a fusion-type join such as by welding or soldering. The join between the central section 13 and the mounting plate 11 is made by a metal which is a good conductor of heat such as copper. This arrangement provides, on one hand, the poor level of thermal conductivity of the alloy of the mounting plate 11 maintains the flow of heat to the edges of such mounting plate at a low level. Accordingly, the material of the container 1 is prevented from at least serious damage due to overheating, because the high temperatures generated at the central section 13 of the tubular heater member 8 are not conducted to a substantial extent to the edges of the mounting plate 11. On the other hand, that arrangement also ensures that the central section 13 is not cooled down excessively by virtue of an excessive flow of heat away from the central section 13, through the mounting plate 11, having regard to the low heat capacity of the thin casing or jacket tube forming the outer casing of the tubular heater member 8, thus preventing heat from not being adequately transferred thereto from a location at which overheating is occurring. As the thermostat switch 10 is disposed on the mounting plate 11 at a location adjoining the thermal bridge formed by the join 14 to the central section 13 of the tubular heater member, the switch 10 accordingly responds in a reliable and sensitive fashion, irrespective of the location on the tubular heater member 8 at which overheating is occurring, thus ensuring that the tubular heater member 8 is switched off when a given limit temperature is exceeded.

As indicated above, the mounting plate 11 carries screw pins 9 which, in the assembled position of the tubular heater member 8, are passed through holes 4 and 5 in the side wall of the container 1, to receive fixing nuts (not shown) which can be screwed thereon. The clamping action of the screw pins 9 causes the mounting plate 11 to be urged towards the adjoining inside surface of the side wall of the container 1. Disposed between the inside surface of the side wall of the container 1 and the surface of the plate 11 which faces theretowards is a seal 12 which is for example in the form of an annular seal and which consists for example of rubber, thereby sealing around the openings 2 through 6 in the side wall of the container 1. A protective cap or cover (not shown) can be fitted on to the screw pins 9, for accommodating the electrical cable to the tubular heater member and possibly a control switch.

As mentioned above, the thermostat switch 10 is fitted into the opening 6 in the side wall of the container 1, being for example a bimetal switch. The switch is held in position by fitting into a depression or recess in the plate 11, which can be clearly seen from FIG. 3, and by being surrounded by the seal 12. It will be seen from FIGS. 1 and 3 therefore that the switch 10 bears from the exterior of the container 1 against the plate 11 at the location of the thermal bridge formed by the fusion join between the central section 13 of the tubular heater member 8 and the plate 11, thereby ensuring sensitive response to the temperature of the central section 13. Thus, the switch 10 operates to switch off the tubular heater member 8 whenever the central section 13 exceeds a given temperature. Because, as mentioned above, the plate 11 is a poor conductor of heat, that ensures that the edge of the plate 11 which bears against the seal 12 does not reach a temperature which could cause damage to the seal 12 or the adjoining part of the wall of the container 1.

It will further be seen from FIG. 3 that the central section 13 of the tubular heater member 8 extends above the connection end portions 7 thereof. If therefore the liquid heating apparatus is left switched on, by mistake, so that the liquid to be heated therein boils away, the level of the liquid first falls below the level of the central section 13 which is thus the first part of the tubular heater member 8 that runs dry. The resulting rise in temperature of the central section 13 will thus cause the switch 10 to respond, to switch off the liquid heating apparatus.

Referring now in particular to FIG. 4, it will be seen therefrom that the fusion join, as by welding or soldering, between the central section 13 of the tubular heater member 8 and the mounting plate 11, is of a length which is somewhat over half the distance between the axes of the two connecting end portions 7 of the tubular heater member 8 so that the heat of the tubular heater member is taken therefrom over a portion of substantial length. That therefore ensures that the removal of heat, even having regard to the relatively low level of heat capacity of the outer casing of the tubular heater member which may comprise for example chrome nickel steel, does not give rise to a severe temperature gradient which could call into question response on the part of the thermostat switch in the even of overheating of the tubular heater member 8.

In specific terms, the length of the join between the straight part of the central section 13, as measured in the axial direction thereof, is preferably from 20 to 30 mm while the height of the join as measured transversely with respect to the length thereof is from 2 to 8 mm. The height of the join is such that the thermally operated switch 10 responds within a reasonable time when the middle section 13 of the tubular heater member 8 runs dry, while however avoiding cyclic response of the switch in the normal operating condition.

Figure 6:
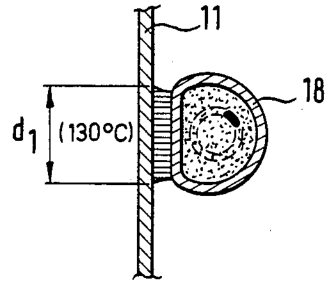
FIGS. 6 through 8 show views on enlarged scales of portions of the assembly shown in FIG. 3, with different heights of thermal bridges between the tubular heater member and the mounting plate and different cross sectional shapes for the tubular heater member.
Figure 7:
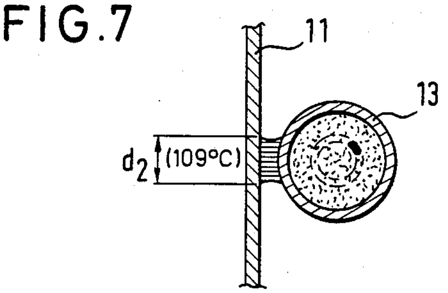
Figure 8:
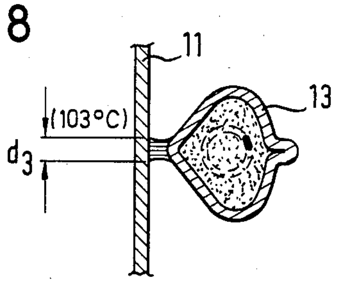

Referring now to FIGS. 6 through 8, the influence exerted by the height or the width of the fusion join between the central section 13 and the plate 11, that is to say the dimension thereof transversely with respect to the axis of the central section 13, will be explained. If the thermostat switch is set to a response temperature of for example 120° C. and the dimension of the join as measured in the axial direction of the central section 13 is from 20 to 30 mm, as indicated above, then with the height or width of the join $d_1$ being 8 mm as shown in FIG. 6, that gives a temperature of 130° C. downstream of the join (in regard to the flow of heat from the tubular heater member 8 towards the switch 10), in normal operation of the tubular heater member in water. That means that the switch 10 begins to cycle, that is to say, the supply of power to the tubular heater member is periodically interrupted. However, the continuously occurring switching operations of that nature load the switch 10, thereby considerably curtailing the service life thereof.

FIG. 7 shows a construction which can enhance the service life of the switch 10, with the height of the join as indicated at $d_2$ being 4 mm. That gives a temperature downstream of the join of 109° C. In the event of the tubular heater member running dry, for example due to the water level being excessively low because of vaporization or omission to refil the container 1, the arrangement gives a response time of 18 seconds, which is satisfactory as no overloading phenomena can occur in that time.

The opposite limit situation is shown in FIG. 8, in which the height or width $d_3$ of the join is 2 mm. That gives a highly advantageous temperature, in the operating condition, of 103° C. However, the response time of the switch in the event of the tubular heater member 8 running dry is already 20 seconds. As that time should not be exceeded, for safety reasons, the width of the fusion join may also not be further reduced.

The height of the fusion join is more preferably between 3 and 7 mm.

The output of the tubular heater member 8, in relation to its surface area, can be raised to 20 Watts/cm$^2$, and preferably to 30 Watts/cm$^2$, by virtue of the fact that the thermostat switch is higher than the remainder of the tubular heater member, apart from the central section 13, without that giving rise to the likelihood of the assembly being put at risk, in other words, in the event of evaporation of the liquid, the thermostat switch always responds before the remainder of the length of the tubular heater member runs dry. That level of heater output also has the effect that the lime deposits which are otherwise inevitable on the surface of the tubular heater member are removed therefrom by the heat output.

It is preferred for the plate 11 to comprise a unitary material as that kind of construction is more economical. Furthermore, while the loop configuration of the tubular member 8 is illustrated as being symmetrical, it would also be possible to use an asymmetrical arrangement.

It will be appreciated that the above-described constructions are set forth solely by way of example of the principles of the present invention and that various modifications and alterations may be made therein without thereby departing from the spirit and scope of the present invention.

What is claimed is:

1. An electrical liquid-heating apparatus, comprising a vessel having a peripheral side wall and a bottom, for receiving a liquid to be heated therein; openings in said side wall in the vicinity of the bottom of said vessel; a tubular heater member disposed in said vessel and having connection end portions mutually spaced apart and extending through respective ones of said openings, said tubular heater member being of a double loop configuration such as to provide a central section disposed in the vicinity of said connection end portions, said central section including an at least substantially straight portion which is disposed above and bridges over the space between said connection end portions; a mounting plate of poor thermal conductivity connected to said tubular heater member and fastened against said side wall of said vessel, said at least substantially straight portion of said central section being joined along its length by a fusion-type join to said plate, to provide a thermal bridge between said central section and said plate; sealing means interposed between said side wall of the vessel and said plate to seal said openings; clamping screw means passing through respective ones of said openings in said side wall of said vessel thereby to fix said plate in position thereon; and a thermally operable switch disposed outside said vessel and in contact with said plate and operable in response to a given temperature being exceeded to switch off said tubular heater member.

2. Apparatus as set forth in claim 1 wherein said openings are separate from each other and receive said connection end portions, said clamping screw means, and said switch, respectively; wherein said sealing means is a resilient seal of a configuration extending around said openings and is pressed against the inside surface of said side wall of said vessel by said plate.

3. Apparatus as set forth in claim 1 wherein said plate comprises a metal which is a poor conductor of heat and wherein the join disposed between said plate and said central section of said tubular heater member is a metal which is a good conductor of heat.

4. Apparatus as set forth in claim 3 wherein the metal of said plate is a chrome nickel steel.

5. Apparatus as set forth in claim 1 wherein said plate has a recess portion therein which is matched to the contour of said switch for receiving said switch and to prevent substantial lateral displacement thereof.

6. Apparatus as set forth in claim 1 wherein the length of said thermal bridge portion corresponds to at least a third of the spacing of said connection end portions from each other.

7. Apparatus as set forth in claim 6 wherein said length of said thermal bridge portion corresponds to at least half said spacing.

8. Apparatus as set forth in claim 6 wherein the length of said join between the straight portion of said tubular heater member and said plate is from 20 to 30 mm and the height of said join as measured transversely with respect to said length is from 2 to 8 mm, the height of the join being so selected that when said middle section runs dry said switch is adapted to respond within 20 seconds but in the operation condition cyclic response of said switch is avoided.

9. Apparatus as set forth in claim 8 wherein said height of said join is from 3 to 7 mm.

10. Apparatus as set forth in claim 8 wherein said switch has a response temperature of substantially 120° C.

11. Apparatus as set forth in claim 1 wherein the heat output of said tubular heater member in relation to surface area is substantially 20 Watts/$cm^2$.

12. Apparatus as set forth in claim 1 wherein said heat output is substantially 30 Watts/$cm^2$.

13. An electrically operated liquid-heating apparatus, comprising a tubular heater member bent in such a fashion as to form twin loop configurations and having end portions mutually spaced apart and adapted to pass through respective openings in the peripheral wall of a vessel that is adapted to receive a liquid to be heated, said tubular heater member having a central section disposed in the vicinity of said end portions and including on at least substantially straight portion which is disposed above and bridges over the space between said end portions; a mounting plate member carried by said connection end portions of the tubular heater member and adapted to fit against said peripheral side wall of said vessel and being provided with openings for receiving said connection end portions, said plate member comprising a material which is a poor thermal conductor thereby to reduce transfer of heat from said connection end portions to said side wall of said vessel; means for fixing said plate member in position on said side wall of said vessel; sealing means carried by said plate for fitting against the inside surface of said wall of said vessel for sealing said openings in said side wall of said vessel; and a thermally operated switch adapted to switch off said tubular heater member when a given temperature is exceeded, said switch being adapted to fit into a receiving opening in said side wall of said vessel for placement externally of said vessel; and a fusion-type join connecting said central section of said tubular heater member in heat-conducting relationship with said plate member along the length of said substantially straight portion of said central section, thereby to provide for transfer of heat from said central section of said tubular heater member to said switch.

14. Apparatus as set forth in claim 13 wherein said plate member fixing means comprise a plurality of clamping screw of said vessel adapted to press said plate member against said side wall means.

15. Apparatus as set forth in claim 13, wherein said plate comprises a metal which is a poor conductor of heat and wherein the join disposed between said plate and said central section of said tubular heater member is a metal which is a good conductor of heat.

16. Apparatus as set forth in claim 15, wherein the metal of said plate is a chrome nickel steel.

17. Apparatus as set forth in claim 13, wherein said plate has a recess portion therein which is matched to the contour of said switch for receiving said switch and to prevent substantial lateral displacement thereof.

18. Apparatus as set forth in claim 13, wherein the length of said thermal bridge portion corresponds to at least a third of the spacing of said connection end portions from each other.

19. Apparatus as set forth in claim 18, wherein said length of said thermal bridge portion corresponds to at least half said spacing.

20. Apparatus as set forth in claim 18, wherein the length of said join between the straight portion of said tubular heater member and said plate is from 20 to 30 mm and the height of said join as measured transversely with respect to said length is from 2 to 8 mm, the height of the join being so selected that when said middle section runs dry said switch is adapted to respond within 20 seconds but in the operating condition cyclic response of said switch is avoided.

21. Apparatus as set forth in claim 20, wherein said height of said join is from 3 to 7 mm.

22. Apparatus as set forth in claim 20, wherein said switch has a response temperature of substantially 120° C.

23. Apparatus as set forth in claim 13, wherein the heat output of said tubular heater member in relation to surface area is substantially 20 Watts/$cm^2$.

24. Apparatus as set forth in claim 13, wherein said heat output is substantially 30 Watts/$cm^2$.

* * * * *